United States Patent
Bao et al.

(10) Patent No.: US 11,306,542 B2
(45) Date of Patent: Apr. 19, 2022

(54) THERMALLY STABLE POLYCRYSTALLINE DIAMOND AND METHODS OF MAKING THE SAME

(71) Applicant: SMITH INTERNATIONAL, INC., Houston, TX (US)

(72) Inventors: Yahua Bao, Orem, UT (US); Liang Zhao, Spring, TX (US); J. Daniel Belnap, Lindon, UT (US); Zhijun Lin, The Woodlands, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1527 days.

(21) Appl. No.: 14/481,570

(22) Filed: Sep. 9, 2014

(65) Prior Publication Data

US 2015/0068817 A1 Mar. 12, 2015

Related U.S. Application Data

(60) Provisional application No. 61/876,696, filed on Sep. 11, 2013.

(51) Int. Cl.
*E21B 10/567* (2006.01)
*E21B 10/43* (2006.01)
(Continued)

(52) U.S. Cl.
CPC .............. *E21B 10/567* (2013.01); *B24D 3/04* (2013.01); *B24D 3/10* (2013.01); *B24D 18/0009* (2013.01);
(Continued)

(58) Field of Classification Search
CPC ........ B24D 3/04; B24D 3/10; B24D 18/0009; B24D 99/005; E21B 10/43; E21B 10/567; E21B 10/5735
See application file for complete search history.

(56) References Cited

U.S. PATENT DOCUMENTS 6,248,447 B1 * 6/2001 Griffin .................. C04B 37/021
175/434
6,527,069 B1 * 3/2003 Meiners ................ E21B 10/567
175/432
(Continued)

FOREIGN PATENT DOCUMENTS

JP S5767071 A 4/1982
JP 09052766 A 2/1997
(Continued)

OTHER PUBLICATIONS

First Office Action issued in Chinese patent application 20140050183.6 dated Nov. 16, 2016, 17 pages.
(Continued)

*Primary Examiner* — Pegah Parvini
*Assistant Examiner* — Ross J Christie

(57) ABSTRACT

A method of making a cutting element includes subjecting a mixture of diamond particles and a carbonate material to high-pressure high-temperature sintering conditions to form a sintered carbonate-polycrystalline diamond body having a diamond matrix of diamond grains bonded together and carbonates residing in the interstitial regions between the diamond grains, the carbonate material having a non-uniform distribution throughout the diamond matrix. The carbonate-polycrystalline diamond body is subjected to a controlled temperature, a controlled pressure condition or a combination thereof, to effect an at least partial decomposition of the carbonate material.

24 Claims, 5 Drawing Sheets

(51) Int. Cl.
*B24D 3/10*       (2006.01)
*B24D 18/00*      (2006.01)
*E21B 10/573*     (2006.01)
*B24D 99/00*      (2010.01)
*B24D 3/04*       (2006.01)

(52) U.S. Cl.
CPC ............ *B24D 99/005* (2013.01); *E21B 10/43*
(2013.01); *E21B 10/5735* (2013.01)

(56) References Cited

U.S. PATENT DOCUMENTS

| | | | |
|---|---|---|---|
| 6,951,578 B1* | 10/2005 | Belnap | B01J 3/065 175/374 |
| 8,147,572 B2* | 4/2012 | Eyre | C22C 26/00 51/307 |
| 2004/0062928 A1* | 4/2004 | Raghavan | B22F 7/06 428/408 |
| 2006/0060390 A1* | 3/2006 | Eyre | C22C 26/00 175/432 |
| 2008/0206576 A1 | 8/2008 | Qian et al. | |
| 2010/0095602 A1* | 4/2010 | Belnap | C04B 35/52 51/309 |
| 2010/0212971 A1* | 8/2010 | Mukhopadhyay | C22C 26/00 175/428 |
| 2010/0236836 A1 | 9/2010 | Voronin | |
| 2010/0294571 A1* | 11/2010 | Belnap | E21B 10/55 51/307 |
| 2011/0031034 A1* | 2/2011 | DiGiovanni | B24D 99/005 175/428 |
| 2011/0120782 A1 | 5/2011 | Cooley et al. | |
| 2011/0132666 A1* | 6/2011 | DiGiovanni | B22F 7/064 51/307 |
| 2011/0241266 A1* | 10/2011 | Wardoyo | B82Y 30/00 264/642 |
| 2012/0241224 A1* | 9/2012 | Qian | B22F 5/00 51/297 |
| 2013/0043078 A1* | 2/2013 | Qian | B22F 7/062 51/297 |
| 2014/0130418 A1 | 5/2014 | Bao et al. | |
| 2014/0131117 A1 | 5/2014 | Bao et al. | |
| 2014/0189011 A1 | 7/2014 | Whitley et al. | |

FOREIGN PATENT DOCUMENTS

| | | |
|---|---|---|
| JP | A20002073 A | 7/2000 |
| WO | WO2007148060 A1 | 12/2007 |
| WO | 2011081924 A1 | 7/2011 |

OTHER PUBLICATIONS

International Preliminary Report on Patentability issued in International application PCT/US2014/054892 dated Mar. 24, 2016, 10 pages.
International Search Report and Written Opinion issued in PCT/US2014/054892 dated Dec. 16, 2014, 14 pages.
Office Action issued in Japanese Patent Application 2016-542053 dated Jun. 11, 2018, 7 pages.
Second Office Action issued in corresponding Chinese application 20140050183.6 dated Aug. 1, 2017, 6 pages.
Office Action issued in Japanese Patent Application 2016-542053 dated Feb. 28, 2019, 6 pages.

* cited by examiner

THERMALLY STABLE POLYCRYSTALLINE DIAMOND AND METHODS OF MAKING THE SAME

CROSS REFERENCE TO RELATED APPLICATION

This patent application claims the benefit of U.S. Provisional Patent Application No. 61/876,696 filed on Sep. 11, 2013, which is incorporated herein by reference in its entirety.

BACKGROUND

Polycrystalline diamond ("PCD") materials and PCD elements formed therefrom are well known in the art. Conventional PCD may be formed by subjecting diamond particles in the presence of a suitable solvent metal catalyst material to processing conditions of high pressure/high temperature (HPHT), where the solvent metal catalyst promotes desired intercrystalline diamond-to-diamond bonding between the particles, thereby forming a PCD structure. The resulting PCD structure produces enhanced properties of wear resistance and hardness, making such PCD materials extremely useful in aggressive wear and cutting applications where high levels of wear resistance and hardness are desired. FIG. 1 illustrates a microstructure of conventionally formed PCD material 10 comprising a plurality of diamond grains 12 that are bonded to one another to form an intercrystalline diamond matrix first phase. The catalyst/binder material 14, e.g., cobalt, used to facilitate the diamond-to-diamond bonding that develops during the sintering process is dispersed within the interstitial regions formed between the diamond matrix first phase. The term "particle" refers to the powder employed prior to sintering a superabrasive material, while the term "grain" refers to discernable superabrasive regions subsequent to sintering, as known and as determined in the art.

The catalyst/binder material used to facilitate diamond-to-diamond bonding can be provided generally in two ways. The catalyst/binder can be provided in the form of a raw material powder that is pre-mixed with the diamond grains or grit prior to sintering. In one or more other embodiments, the catalyst/binder can be provided by infiltration into the diamond material (during high temperature/high pressure processing) from an underlying substrate material that the final PCD material is to be bonded to. After the catalyst/binder material has facilitated the diamond-to-diamond bonding, the catalyst/binder material is generally distributed throughout the diamond matrix within interstitial regions formed between the bonded diamond grains. Particularly, as shown in FIG. 1, the binder material 14 is not continuous throughout the microstructure in the conventional PCD material 10. Rather, the microstructure of the conventional PCD material 10 may have a uniform distribution of binder among the PCD grains. Thus, crack propagation through conventional PCD material will often travel through the less ductile and brittle diamond grains, either transgranularly through diamond grain/binder interfaces 15, or intergranularly through the diamond grain/diamond grain interfaces 16.

Solvent catalyst materials may facilitate diamond intercrystalline bonding and bonding of PCD layers to each other and to an underlying substrate. Solvent catalyst materials generally used for forming conventional PCD include metals from Group VIII of the Periodic table, such as cobalt, iron, or nickel and/or mixtures or alloys thereof, with cobalt being the most common. Conventional PCD may comprise from 85 to 95% by volume diamond and a remaining amount of the solvent catalyst material. However, while higher metal content generally increases the toughness of the resulting PCD material, higher metal content also decreases the PCD material hardness, thus limiting the flexibility of being able to provide PCD coatings having desired levels of both hardness and toughness. Additionally, when variables are selected to increase the hardness of the PCD material, generally brittleness also increases, thereby reducing the toughness of the PCD material.

PCD is commonly used in earthen drilling operations, for example in cutting elements used on various types of drill bits. Although PCD is extremely hard and wear resistant, PCD cutting elements may still fail during normal operation. Failure may occur in three common forms, namely wear, fatigue, and impact cracking. The wear mechanism occurs due to the relative sliding of the PCD relative to the earth formation, and its prominence as a failure mode is related to the abrasiveness of the formation, as well as other factors such as formation hardness or strength, and the amount of relative sliding involved during contact with the formation. Excessively high contact stresses and high temperatures, along with a very hostile downhole environment, also tend to cause severe wear to the diamond layer. The fatigue mechanism involves the progressive propagation of a surface crack, initiated on the PCD layer, into the material below the PCD layer until the crack length is sufficient for spalling or chipping. Lastly, the impact mechanism involves the sudden propagation of a surface crack or internal flaw initiated on the PCD layer, into the material below the PCD layer until the crack length is sufficient for spalling, chipping, or catastrophic failure of the cutting element.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a method of making a cutting element that includes subjecting a mixture of diamond particles and a carbonate material to high-pressure high-temperature sintering conditions to form a sintered carbonate-polycrystalline diamond body having a diamond matrix of diamond grains bonded together and carbonates residing in the interstitial regions between the diamond grains, the carbonate material having a non-uniform distribution throughout the diamond matrix and subjecting the carbonate-polycrystalline diamond body further to a controlled temperature, a controlled pressure, or a combination thereof, to effect an at least partial decomposition of the carbonate material.

In another aspect, embodiments of the present disclosure relate to a cutting element that includes an oxide-based polycrystalline diamond body including a plurality of bonded together diamond grains forming a matrix phase, a plurality of interstitial regions interposed between the bonded together diamond grains, and an oxide material disposed non-uniformly within the interstitial regions. The oxide-based polycrystalline diamond body may further include a first region forming and proximate a cutting edge and a second region extending axially, radially or a combination of both away from the first region, where the second region has a higher concentration or carbonate material than the first region.

In yet another aspect, embodiments of the present disclosure relate to a cutting element that includes a carbonate-based polycrystalline diamond body including a plurality of bonded together diamond grains forming a matrix phase, a plurality of interstitial regions interposed between the bonded together diamond grains, and a carbonate material disposed non-uniformly within the interstitial regions. The oxide-based polycrystalline diamond body may further include a first region forming and proximate a cutting edge and a second region extending axially, radially or a combination of both away from the first region, where the second region has a higher concentration or carbonate material than the first region.

Other aspects and advantages of the claimed subject matter will be apparent from the following description and the appended claims.

BRIEF DESCRIPTION OF DRAWINGS

Embodiments of the present disclosure are described with reference to the following figures. The same numbers are used throughout the figures to reference like features and components.

DETAILED DESCRIPTION

Figure 1:
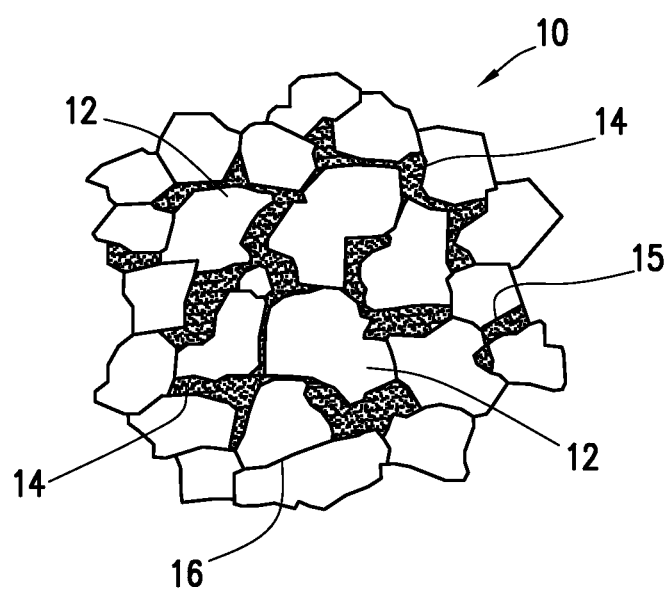
FIG. 1 shows the microstructure of conventionally formed polycrystalline diamond.

As used herein, the term carbonate-based polycrystalline diamond refers to the resulting material produced by subjecting individual diamond particles in the presence of a carbonate material to sufficiently high-pressure high-temperature (HPHT) conditions that causes intercrystalline bonding to occur between adjacent diamond crystals to form a network or matrix phase of diamond-to-diamond bonding and a plurality of interstitial regions dispersed between the bonded together diamond grains. Carbonate-based polycrystalline diamond of the present disclosure may be referred to as polycrystalline diamond or PCD, but is distinguished from conventionally formed polycrystalline diamond (described in the background section) formed with a transition metal solvent catalyst. Further, one or more embodiments also relate to oxide-based polycrystalline diamond formed through decomposition of a carbonate-based polycrystalline diamond body.

A carbonate-based polycrystalline diamond body may have a microstructure including a matrix phase of a plurality of bonded together diamond grains with a plurality of interstitial regions interposed between the bonded together diamond grains and a carbonate material disposed within the interstitial regions, wherein the carbonate material is selected from an alkaline earth metal carbonate. In carbonate-based polycrystalline diamond material of the present disclosure, inclusion of a transition metal catalyst, silicon, and/or a silicon-containing compound is not needed for formation of diamond-to-diamond bonds, and thus the carbonate-based polycrystalline diamond bodies may not contain such materials. Further, an oxide-based polycrystalline diamond body may have a microstructure including a matrix phase of a plurality of bonded together diamond grains with a plurality of interstitial regions interposed between the bonded together diamond grains and an oxide material disposed within the interstitial regions. Such oxide may be formed through decomposition of alkaline earth metal carbonate.

In one or more embodiments a carbonate-based polycrystalline diamond body of the present disclosure may be formed by using both a carbonate sintering agent and an optional infiltrant material. For example, a method of making a polycrystalline diamond body may include forming multiple layers of premixed diamond particles and carbonate material, wherein the carbonate material is selected from an alkaline earth metal carbonate. As used herein, a layer may include an amount of premixed diamond particles and carbonate material extending a thickness and an area measured perpendicular to the thickness. A layer of premixed material may have a weight percent ratio of diamond to carbonate that is uniform or non-uniform through the thickness and/or across the area of the layer. In one or more embodiments, a plurality of uniform layers may be combined where each layer has a different diamond and carbonate concentration. In one or more other embodiments, at least one layer having a non-uniform distribution of diamond and carbonate across one of the thickness and area. It is also within the scope of the present disclosure that the layers need not have a uniform area (as defined above) along the thickness or that the layers need not be axially stacked. Thus, the layers may be concentric with one another or otherwise formed. Further, the layers may take the form of other shapes than a disc, cylinder, annular body, etc., and may vary depending on the desired carbonate placement within the resulting carbonate body. The premixed layers may be sintered together by subjecting the layers to high-pressure high-temperature conditions, such as pressures greater than 6 GPa and temperatures greater than 1700° C. and within the region of diamond thermodynamic stability. For example, in some embodiments, the premixed layers may be sintered together under a pressure of 6-10 GPa and a temperature of greater than 2,000° C., or under a pressure of 7-9 GPa and a temperature of greater than 2,000° C. Further, an infiltration layer made of one or more carbonates of an alkaline earth metal may be positioned adjacent to one of the premixed layers, wherein during the sintering process, the carbonates of the infiltration layer infiltrate a depth into the premixed layers. The depth of infiltration may depend on the composition of the premixed layers and the sintering conditions, for example.

Figure 2:
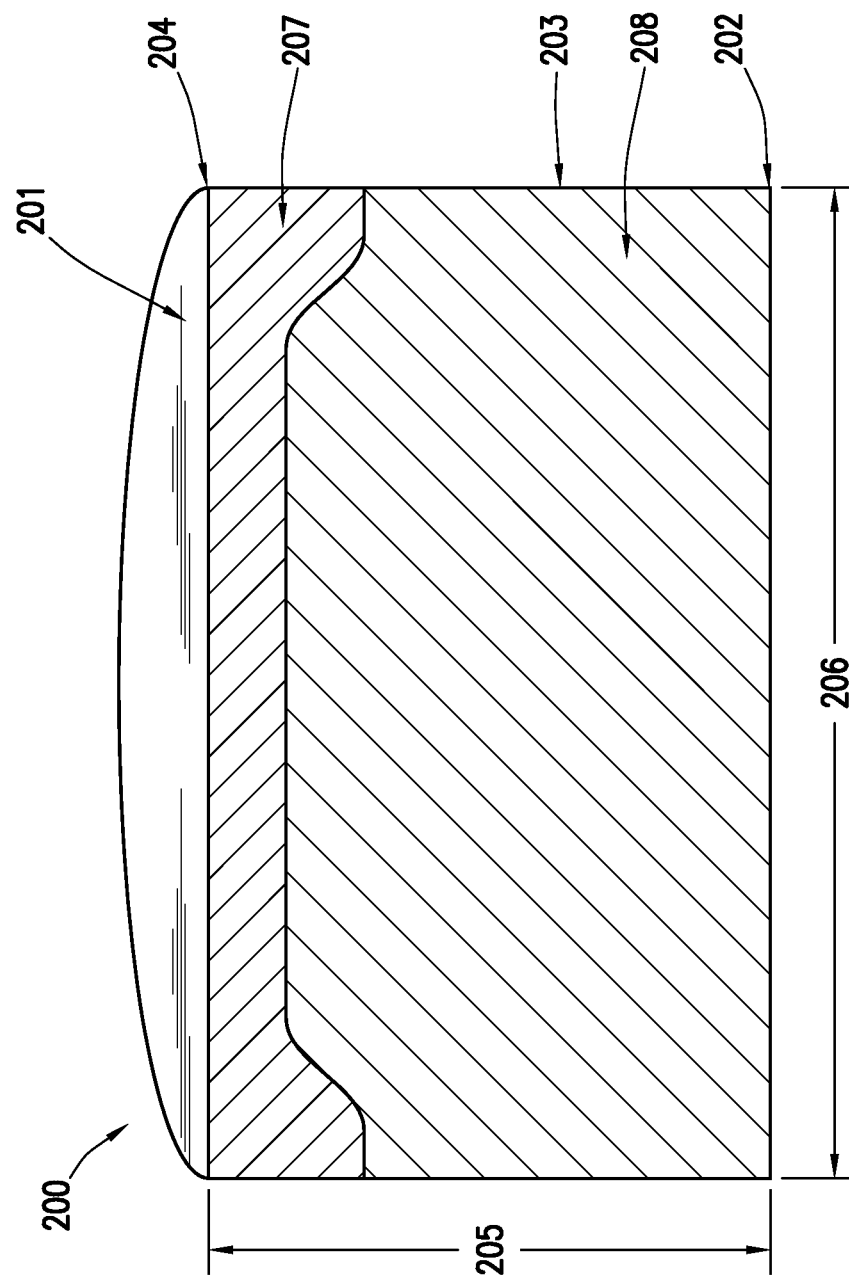
FIG. 2 shows a carbonate-based polycrystalline diamond body according to embodiments of the present disclosure.

Forming a carbonate-based polycrystalline diamond body according to methods disclosed herein allows for the formation of a solid polycrystalline diamond. For example, FIG. 2 shows a carbonate-polycrystalline diamond high-pressure high-temperature sintered body according to some embodiments of the present disclosure. The body 200 has an upper surface 201, a bottom surface 202, a circumferential side surface 203 between the upper and bottom surface, and a circumferential cutting edge 204 between the upper surface and circumferential side surface, wherein a height 205 is measured between the upper surface and the bottom surface. According to some embodiments the height 205 of the carbonate-polycrystalline diamond high-pressure high-temperature sintered body is smaller than the diameter 206. As used herein, a working surface may refer to an outer surface of a polycrystalline diamond body that contacts and cuts a work piece or earthen formation. Thus, the working surface shown in FIG. 2 may include the upper surface 201 of the body 200 and may also include a portion of circumferential side surface 203, while the non-working surface is shown as being a bottom surface 202 of the body. Further, the body shown in FIG. 2 has a cylindrical shape. However, carbonate-based polycrystalline diamond material of the present disclosure may be formed into other shapes, such as rectangular or triangular prism, or may have a non-planar cutting end, such as with a dome-shaped, a saddle-shaped (hyperbolic paraboloid), parabolic cylinder-shaped, conical, or bullet shaped cutting end. However, it is also intended that other geometries may be used.

As shown in FIG. 2 the body 200 includes a first region 207 and a second region 208. The first region 207 includes a first carbonate material disposed in the interstitial regions of the bonded together diamond grains and forms the circumferential cutting edge. Specifically, in the illustrated embodiment, the first region extends an axial depth into the body 200 from the upper surface 201 and circumferential cutting edge 204 and thus forms entire upper surface 201, the entire circumferential cutting edge 204 and a portion of circumferential side surface 203. As shown, the first region 207 extends a non-uniform depth into the diamond body. Specifically, first region 207 extends a greater depth along circumferential side surface 203 than in the radially most interior portions of the body 200. A second region 208 at least extends axially downward from the first region, wherein the second region comprises a second carbonate material disposed in the interstitial regions of the bonded together diamond grains and forms the bottom surface 202 and the remaining portion of circumferential side surface 203.

In one or more embodiments, the second region may have a higher concentration of carbonate material than the first region. In another embodiment a first region may have magnesium carbonate disposed within the interstitial regions of the bonded together diamond grains, and a second region may have calcium carbonate disposed within the interstitial regions of the bonded together diamond grains. In other embodiments, a first region may be formed of diamond and magnesium carbonate, and a second region may be formed of diamond, magnesium carbonate and calcium carbonate. However, in yet other embodiments, an entire polycrystalline diamond body may be formed of a single type of carbonate or a uniform distribution of more than one type of carbonate disposed within the interstitial regions of the bonded together diamond grains. In a particular embodiment the first region of the carbonate-based polycrystalline diamond body includes from about 0.5 to 5 percent by weight of the carbonate material. In yet another embodiment the second region includes from about 2 to 9 percent by weight of the carbonate material. Each of the above embodiments may incorporate a layer of carbonate material separate from the mixtures of carbonate and diamond powders, which layer serves the purpose of providing a carbonate infiltration source into the diamond containing regions during HPHT sintering.

While FIG. 2 has been described as relating to a carbonate-based polycrystalline diamond body, the carbonate-based bodies formed in accordance with the present disclosure may also be subjected to a decomposition process to decompose the carbonate into carbon dioxide and a metal oxide. Despite decomposition, the resulting body 200, as shown in FIG. 2, may still have a first and second region 207 and 208 containing metal oxides in place of the carbonates and/or different diamond concentrations in the two regions, depending on how the carbonate based body was formed.

Further, in some embodiments the second region can extend axially and/or radially away from the first region. In one or more embodiments, the second region (having a greater amount of carbonate than first region) may extend to at least one of a circumferential side surface and an upper surface of the diamond body. In such embodiments the second region may be spaced a distance of 0.050" to 0.250" (0.127 cm to 0.635 cm) from the circumferential cutting edge.

Figure 3:
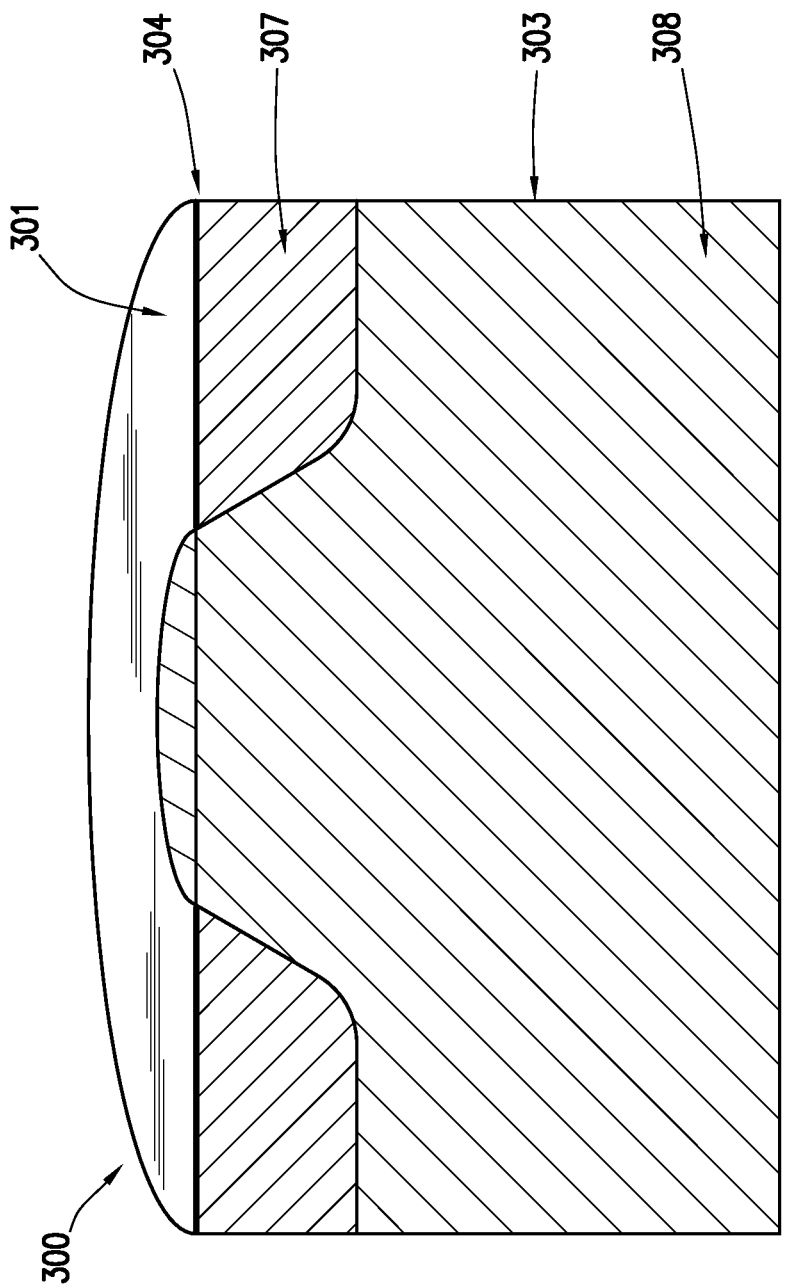
FIGS. 3 and 4 show a carbonate-based polycrystalline diamond body according to embodiments of the present disclosure.

FIG. 3 shows a carbonate-polycrystalline diamond high-pressure high-temperature sintered body 300 according to some embodiments of the present disclosure, wherein the diamond body 300 comprises a first region 307 forming and proximate the circumferential cutting edge 304 and a second region 308 extending axially and radially away from the first region 307, where the second region 308 has a higher concentration of carbonate material than the first region 307. Specifically, FIG. 3 shows that upper surface 301 is formed from both first region 307 and second region 308, with first region 307 being radially exterior to second region 308 along upper surface 301 and a portion of circumferential side surface 303. In this embodiment, first region 307 extends less than 50% of the height of body 300 along circumferential side surface 303, and specifically less than 30%. In one or more embodiments first region 307 may occupy at least 15% or at least 20% or 25% (including up to 100%) of circumferential side surface 303. This axial extension may also be considered as a depth from the upper surface 301. In one or more embodiments, the depth of first region 307 along the circumferential side surface 303 may be at least 100 microns, or at least 200, 250 or 500 microns in one or more other embodiments.

Figure 4:
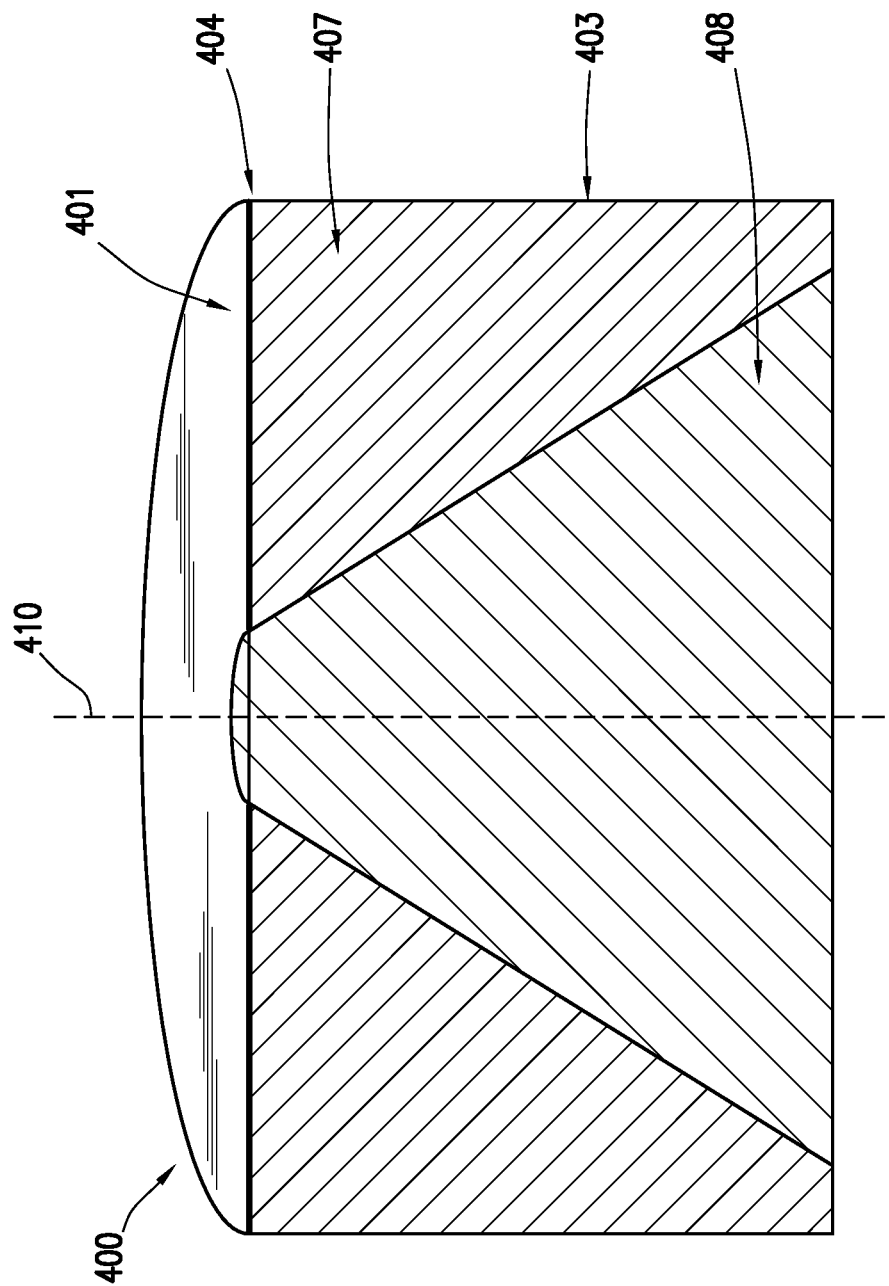

While circumferential side surface 303 is shown as including both first region 307 and second region 308, the present disclosure is not so limited. For example, referring now to FIG. 4, in one or more embodiments, first region 407 may extend along the entire circumferential side surface 403 of body 400. Similar to FIG. 3, body 400 includes an upper surface 401 that includes both first region 407 and second region 408, where first region 407 is radially exterior to second region 408. However, in this embodiment, first region 407 extend further to the radial center 410 than the embodiment illustrated in FIG. 3. In the embodiment illustrated in FIG. 3, the first region 307 extends at least half of the upper surface 301 to the radial center, whereas the first region 407 extends at least 75% of the distance from the edge 404 to radial center 410 in the embodiment illustrated in FIG. 4. Thus, in one or more embodiments, the first region may extend at least 30%, at least 50%, at least 75% of the distance or the entire distance from the circumferential edge to the radial center of the body.

According to embodiments of the present disclosure, the weight percent of carbonate in a premixed layer used to form first and/or second region may range from greater than 0 percent carbonate by weight to less than about 20 percent carbonate by weight, and the weight percent of diamond in a premixed layer may range from greater than 80 percent diamond by weight to less than 100 percent diamond by weight. For example, some embodiments may include a diamond and carbonate mixture having a weight percent ratio of diamond to carbonate that includes greater than about 90 percent by weight of diamond and less than about 10 percent by weight of carbonate material. In another embodiment, one or more premixed layers may have a weight percent ratio of diamond to carbonate that includes greater than 95 percent by weight diamond and less than 5 percent by weight carbonate. For example, in some embodiments, one or both outer layers of a premixed layer assembly may have 4 percent or less by weight of carbonate material and 96 percent or more by weight diamond. In other embodiments, one or both outer layers of a premixed layer assembly may have 2 percent or less by weight of carbonate material and 98 percent or more by weight diamond, depending on grain size. In some embodiments, the premix layer of the first region may include about 0.1 to 10 wt % of carbonate, and the premix layer of the second region may include about 1 to 30 wt % of carbonate. In other embodiments, the premix layer of the first region may include 0.5 to 3 wt % of carbonate, and the premix layer of the second region may include about 2 to 7 wt % of carbonate. Each of the above embodiments may incorporate a layer of carbonate material separate from the mixtures of carbonate and diamond powders, which layer serves the purpose of providing a carbonate infiltration source into the diamond containing regions during HPHT sintering.

Diamond particles used in the diamond and carbonate mixtures to form the carbonate based polycrystalline diamond body of the present disclosure may include, for example, natural or synthetic diamond, and may have varying particle sizes, depending on the end use application. For example, diamond particles may range in size from submicrometer to 100 micrometers (fine and/or coarse sized), and from 1-5 micrometers in some embodiments, from 5-10 micrometers in other embodiments, from 10-15 micrometers in other embodiments, and from 15-20 micrometers in yet other embodiments. Further, diamond particles may have a monomodal distribution (having the same general average particle size) or a multimodal distribution (having different volumes of different average particle sizes). Carbonate materials that may be used in the diamond and carbonate mixtures forming premixed layers of the present disclosure (and as an infiltration material in some embodiments) may include alkaline earth metal carbonates, such as, for example, magnesium carbonate or calcium carbonate. The carbonate material may have a particle size ranging from submicron to 100 micrometers and from 0.1 to 30 micrometers in some embodiments.

A sintering agent and/or an infiltrant material may also optionally include a carbon additive. For example, in addition to an alkali metal carbonate and/or an alkaline earth metal carbonate material, a sintering agent and/or infiltrant material may also include a carbon additive such as graphite, diamond, soot or amorphous carbon. Upon subjecting the premixed layer and adjacent infiltration layer to HPHT, the carbon additive may be incorporated and dispersed throughout the polycrystalline diamond body. For example, according to some embodiments, a sintering agent may include graphite (in addition to a carbonate material), which is dispersed throughout a premixed layer and may convert to diamond upon being subjected to HPHT conditions, thereby providing increased diamond density within the polycrystalline diamond body. According to some embodiments, a sintering agent may include up to about 6 percent by volume of a carbon additive and an infiltrant material may include up to about 20 percent by volume of a carbon additive.

According to some embodiments of the present disclosure, the sintering agent and the infiltrant material may be formed of the same material. For example, a premixed layer may be formed by mixing an amount of magnesium carbonate with diamond powder, and an infiltration layer made of magnesium carbonate may be formed adjacent to the premixed layer, such that upon subjecting the layers to high pressure high temperature conditions, the magnesium carbonate of the infiltration layer infiltrates into the premixed layer.

However, according to other embodiments of the present disclosure, the sintering agent and the infiltrant material may be formed of different materials. For example, a premixed layer may be formed by mixing an amount of a sintering agent with diamond powder, and an infiltration layer made of an infiltrant material may be formed adjacent to the premixed layer, wherein the sintering agent has a lower melting point than the infiltrant material. For example, a premixed layer may include diamond powder mixed with calcium carbonate, and an adjacent infiltration layer may be formed of a magnesium carbonate infiltrant material. Further, according to some embodiments, a premixed layer may include more than one carbonate material and/or an infiltration layer may include more than one carbonate material. For example, according to one or more embodiments, a premixed layer and/or an infiltration layer may include both magnesium carbonate and calcium carbonate. In addition, as the carbonate material may not be pure, a premixed layer and/or an infiltration layer may include besides at least one carbonate material, a small percentage of $SiO_2$ and/or $Al_2O_3$.

A premixed carbonate/diamond layer may include an amount of sintering agent ranging from greater than 0 percent by volume to about 8 percent by volume of the premixed layer depending on grain size and the thickness of the polycrystalline diamond body. Other embodiments may include an amount of sintering agent ranging from a lower limit of any of 0.1 percent, 1.0 percent, 2.0 percent or 3.0 percent by volume and an upper limit of any of 2.0 percent, 3.0 percent, 4.0 percent, 5.0 percent, 6.0 percent, 7.0 percent, 8.0 percent, 9.0 percent or 10.0 percent by volume, where any lower limit can be used in combination with any upper limit. Using a small amount of premixed carbonate may promote the infiltration depth and enhance the quality of the final sintering.

Additionally, an infiltration layer may include an amount of infiltrant material ranging from about 1 to about 20 percent by volume of the sintered polycrystalline diamond body. According to other embodiments, the amount of infiltrant material may be greater than 20 percent by volume, greater than 30 percent by volume or greater than 50 percent by volume of the sintered polycrystalline diamond body. However, other amounts of infiltrant material may be provided to ensure infiltration through the entire premixed layer. For example, the amount of infiltrant material placed adjacent to the premixed layer and forming the infiltration layer may vary, depending on the size and thickness of the premixed layer, such that the amount is sufficient for full infiltration of the premixed layer. For example, in embodiments having a relatively thick premixed layer, a relatively large weight percent of infiltrant material may be provided so that upon subjecting the premixed layer and adjacent infiltration layer to HPHT, the infiltrant material may infiltrate the entire premixed layer to form the polycrystalline diamond body. In some embodiments having a relatively thinner premixed layer, a relatively smaller weight percent of infiltrant material may be used to infiltrate the entire premixed layer.

Further, the sintering agent may be mixed with diamond powder to form a premixed layer such that the sintering agent is uniformly distributed throughout the premixed layer. In one or more other embodiments, the sintering agent may be non-uniformly distributed throughout the premixed layer. For example, the sintering agent may be distributed as a gradient throughout the premixed layer. A premixed sintering agent distributed throughout the premixed carbonate/diamond layer and subjected to HPHT conditions may provide localized regions that wet the diamond particles throughout the premixed carbonate/diamond layer. These regions of liquid premixed carbonate may provide channels through the diamond material, which may help provide a path for an adjacent carbonate infiltrant material to melt and flow through during the HPHT conditions. Thus, upon subjecting a premixed layer and adjacent infiltration layer to HPHT conditions according to methods of the present disclosure, the infiltrant material may be disposed throughout the entire sintered polycrystalline diamond body.

Methods of the present disclosure may provide thermally stable polycrystalline diamond due to the use of carbonates as a sintering agent and an optional infiltrant material rather than conventionally used metal catalysts, such as cobalt. Further, pathways provided by the premixed sintering agent for the infiltrant material to flow through and infiltrate into an entire diamond layer allows for an increased amount of diamond relative to the amount of carbonate material (i.e., a higher volume density of diamond), and thus may provide the polycrystalline diamond bodies with increased wear or abrasion resistance.

In various embodiments, a formed carbonate-polycrystalline diamond body having carbonate material residing in the interstitial regions may be subjected to a decomposition process of the carbonate under controlled temperature and/or controlled pressure condition, whereby the carbonate material is at least partially removed through chemical reaction upon exposure to elevated temperature and/or pressure. The decomposition of the carbonate material may result in the formation of metal oxides and channels distributed throughout the matrix. In some instances it may be advantageous to use methods to reduce the carbon dioxide partial pressure as the decomposition of the carbonate material proceeds. Methods to do this include using chemicals which are capable of adsorbing/absorbing the carbon dioxide such as zeolites, ordered mesoporous silica compositions, carbonaceous materials (such as graphene and/or carbon nanotubes), lithium based materials, and calcium based materials.

A decomposition process of carbonates may involve the exposure of the carbonate to be decomposed. As such, when $BaCO_3$, $MgCO_3$, $CaCO_3$ and $CaMg(CO_3)_2$ undergo heating in a vacuum or in a pressure reduced atmosphere at a temperature of 600° C. to 1300° C., they change into oxides, i.e., barium oxide, magnesium oxide and calcium oxide, by chemical reaction. In one or more embodiments, the temperature may include a lower limit of any of 600° C., 800° C., or 1000° C., and an upper limit of any of 1000° C., 1200° C., 1300° C., or 1400° C., where any lower limit can be used in combination with any upper limit. The pressures used for the heat treatment may range from any lower limit of $10^{-8}$, $10^{-6}$, or $10^{-5}$ mmHg to any upper limit of $10^{-1}$, $10^{-2}$, or $10^{-3}$ mmHg, where any lower limit can be used in combination with any upper limit. At these pressures, heating may be performed in air, oxygen, nitrogen, etc., and in one or more particular embodiments, in an inert atmosphere to avoid burning of the diamond. The temperature may be raised at any rate, or from 0.1-20° C. per minute in particular embodiments.

Once the decomposition process is completed and the polycrystalline diamond body formed, the resulting material microstructure of the decomposed portion of the diamond body may include a plurality of the bonded together diamond grains forming a matrix phase, a plurality of empty interstitial regions or channels interposed between the bonded together diamond grains and an oxide material disposed non-uniformly within the interstitial regions. Thus the decomposed portion of the diamond body may be substantially free of carbonate material used to initially form or sinter the diamond body, and may be referred to as oxide-based-polycrystalline diamond. In a particular embodiment, the carbonate-polycrystalline diamond body having carbonate material residing in the interstitial regions may be subjected to a partial decomposition of the carbonate. In yet another embodiment, the decomposition process involving a carbonate-polycrystalline diamond body having carbonate material which contains impurities such as $SiO_2$ will result in the formation of a polycrystalline diamond body that may include a plurality of the bonded together diamond grains forming a matrix phase, a plurality of empty interstitial regions or channels interposed between the bonded together diamond grains, an oxide material disposed non-uniformly within the interstitial regions and metal silicates formed during the heat treatment.

In one or more embodiments, the decomposition occurs with the formation of metal oxides and channels, wherein the channels in the polycrystalline diamond body are formed by the release of the carbon dioxide gas from the decomposition reaction of the premixed carbonate through a diffusion controlled process. Because metal carbonate splits into carbon dioxide and metal oxides, the metal oxide present may depend on the type of metal carbonate used. In an example embodiment, the metal oxide may be an alkaline earth metal oxide. In another example embodiment, the metal oxide may be magnesium oxide, calcium oxide or a combination of thereof. In some embodiments, when the carbonate is decomposed, the weight of the metal oxide is about 75% of the weight of the metal carbonate, while in other embodiments, the weight of the metal oxide is about 50% of the weight of the metal carbonate (e.g., the weight of the metal oxide is about 50 to 75% of the weight of the metal carbonate). The weight of the metal oxide remaining after decomposition of the metal carbonate depends on several factors, including the metal used and the extent of decomposition that is effected. In an embodiment, the first region of the oxide-based polycrystalline diamond body may include from about 0.2 to 5 percent by weight of the oxide material. In yet another embodiment the second region includes from about 0.5 to 9 percent by weight of the oxide material. In an embodiment, the first region of the oxide-based polycrystalline diamond body may include from about 0.2 to 5 percent by weight of the oxide material, the second region may include from about 0.5 to 9 percent by weight of the oxide material, and the second region may include more oxide material than the first region.

During the decomposition of the carbonate material into carbon oxide and metal oxides there is a potential for carbon dioxide to cause high internal gas pressure, which can adversely impact the thermal stability of the PCD, and/or the formation of cracks in the PCD material. In order to avoid the cracking of PCD materials, it maybe desirable to decompose the carbonate material at low temperature with a slow controlled rate. The present inventors have also found that using two distinct regions of carbonate-based diamond with different premixed carbonate concentrations will result in different channel sizes to form during the decomposition process. Thus, carbon dioxide released from the decomposition reaction of the carbonate material will quickly diffuse out of the PCD layer.

By strategically placing the first and second regions so that the first region (with a higher diamond concentration and lower carbonate concentration) at the circumferential cutting edge and extending radially inward and axially down and a second region (with lower diamond concentration and higher carbonate concentration) away from the circumferential cutting edge may also form desirable channels formation without sacrificing wear resistance at the cutting edge. Further, channels formed after the decomposition of the carbonate material having a non-uniform distribution may allow for the conversion of the carbonate material to a metal oxide to proceed more effectively, therefore improving the thermal stability of the diamond body.

Figure 5:
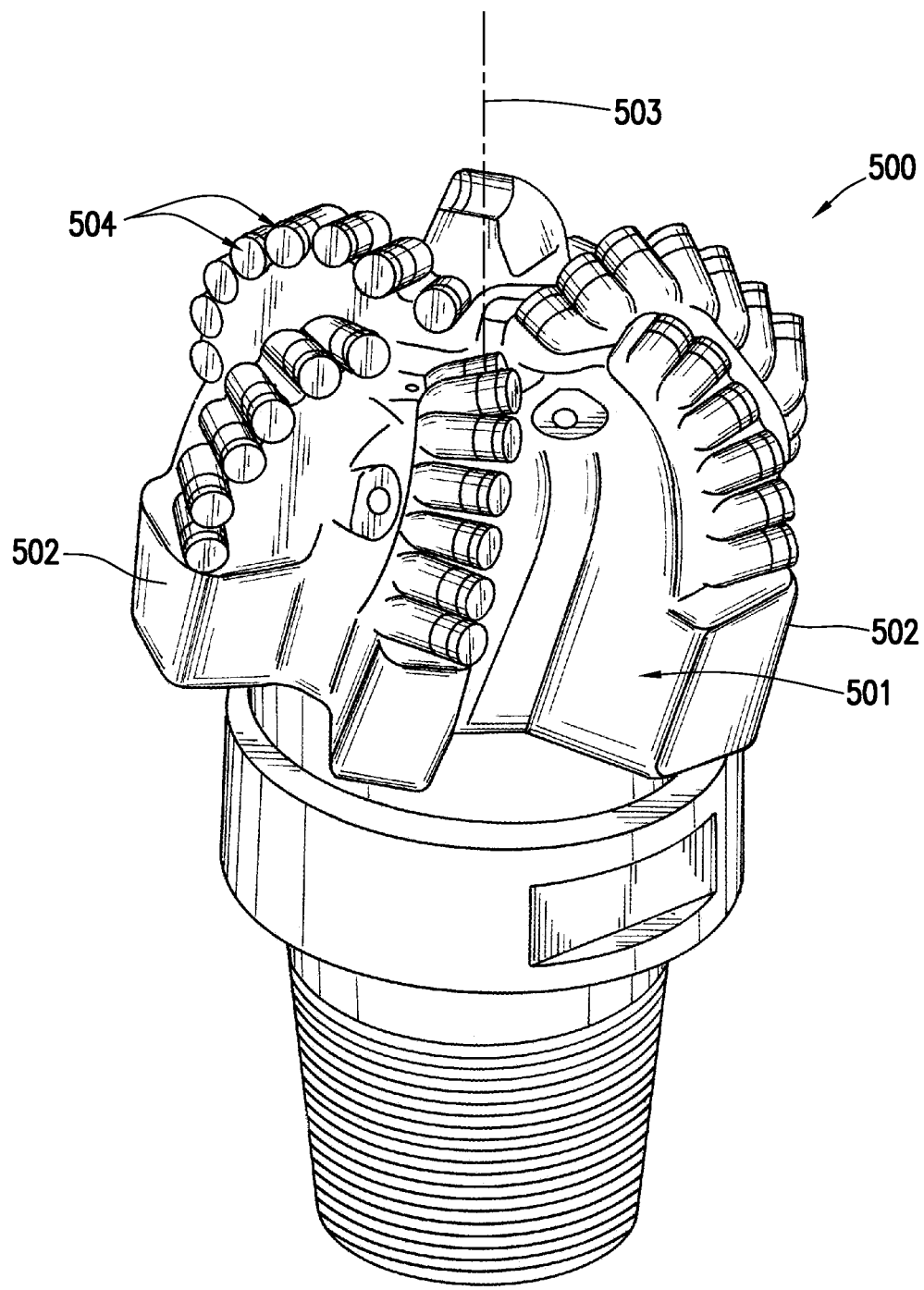
FIG. 5 shows a PDC drill bit.

Polycrystalline diamond bodies made according to embodiments of the present disclosure may be used as cutting elements on down hole cutting tools, such as drill bits. For example, down hole tools of the present disclosure may have a body, a plurality of blades extending from the body, and at least one polycrystalline diamond cutting element according to embodiments of the present disclosure disposed on the plurality of blades. The at least one polycrystalline diamond cutting element is disposed on the blades such that a working surface, i.e., a surface that contacts and cuts the formation being drilled, is positioned at a leading face of the blade and faces in the direction of the drill's rotation. The polycrystalline diamond cutting element may include a polycrystalline diamond body made of a plurality of bonded together diamond grains forming a matrix phase, a plurality of interstitial regions interposed between the bonded together diamond grains, and a carbonate material disposed within the interstitial regions, wherein the carbonate material is selected from at least one of an alkali metal carbonate and an alkaline earth metal carbonate. For example, FIG. 5 shows a rotary drill bit 500 having a bit body 501. The lower face of the bit body 501 is formed with a plurality of blades 502, which extend generally outwardly away from a central longitudinal axis of rotation 503 of the drill bit. A plurality of PDC cutters 504 are disposed side by side along the length of each blade. The number of PDC cutters 504 carried by each blade may vary.

A polycrystalline diamond cutting element may be brazed or mechanically retained on the bit. Such mechanical retention may include one or more components that limit the movement of the cutting element within a pocket (or other support structure), including, for example, a mechanical retention mechanism that is adjacent the leading face of the cutting element, spring retention mechanisms, pins, screws, clamps, retention rings, back retainers, and the like. Depending on the type of mechanical retention used, the cutting element may, in some embodiments, be free to rotate about its own axis (yet still retained on the bit through limited axial and lateral movement). In yet other embodiments, a polycrystalline diamond cutting element of the present disclosure may be brazed within a pocket formed in a blade or body of a down hole cutting tool.

Although only a few example embodiments have been described in detail above, those skilled in the art will readily appreciate that many modifications are possible in the example embodiments without materially departing from this disclosure. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of making a cutting element, comprising:
    subjecting at least one layer comprising a premixture of diamond particles and a carbonate material throughout the at least one layer to high-pressure high-temperature sintering conditions, the at least one layer having a non-uniform distribution of diamond particles and carbonate material in the premixture through a thickness of the at least one layer, to form a sintered carbonate-polycrystalline diamond body having a diamond matrix of diamond grains bonded together and carbonates residing in the interstitial regions between the diamond grains, the carbonates having a non-uniform distribution throughout the diamond matrix such that a first region and a second region are formed; and
    subjecting the carbonate-polycrystalline diamond body further to a controlled temperature, a controlled pressure, or a combination thereof, to effect an at least partial decomposition of the carbonate material.

2. The method of claim 1, wherein partial decomposition of the carbonate material to metal oxides results in formation of channels distributed through the matrix.

3. The method of claim 2, wherein the channels formed after the decomposition of the carbonate material have a non-uniform distribution.

4. The method of claim 1, wherein the carbonate material comprises $SiO_2$ as an impurity.

5. The method of claim 4, wherein during the partial decomposition of the carbonate material to at least one metal oxide, the at least one metal oxide reacts with $SiO_2$ present as an impurity in the carbonate material, thereby resulting in the formation of at least one metal silicate.

6. The method of claim 1, wherein the carbonate material comprises an alkaline earth metal carbonate.

7. The method of claim 6, wherein the carbonate material comprises at least one of magnesium carbonate or calcium carbonate.

8. The method of claim 1, wherein a height of the carbonate-polycrystalline diamond high-pressure high-temperature sintered body is smaller than a diameter of the carbonate-polycrystalline diamond high-pressure high-temperature sintered body.

9. The method of claim 1, wherein the first region of the carbonate-based polycrystalline diamond body comprises from about 0 to 5 percent by weight of the carbonate material.

10. The method of claim 1, wherein the second region of the carbonate-based polycrystalline diamond body comprises from about 2 to 9 percent by weight of the carbonate material.

11. A method of making a cutting element, comprising:
    subjecting at least one layer comprising a premixture of diamond particles and a carbonate material throughout the at least one layer to high-pressure high-temperature sintering conditions, the at least one layer having a non-uniform distribution of diamond particles and carbonate material in the premixture through an area of the layer, to form a sintered carbonate-polycrystalline diamond body having a diamond matrix of diamond grains bonded together and carbonates residing in the interstitial regions between the diamond grains, the carbonates having a non-uniform distribution throughout the diamond matrix such that a first region and a second region are formed; and subjecting the carbonate-polycrystalline diamond body further to a controlled temperature, a controlled pressure, or a combination thereof, to effect an at least partial decomposition of the carbonate material.

12. The method of claim 11, wherein partial decomposition of the carbonate material to metal oxides results in formation of channels distributed through the matrix.

13. The method of claim 12, wherein the channels formed after the decomposition of the carbonate material have a non-uniform distribution.

14. The method of claim 11, wherein the carbonate material comprises $SiO_2$ as an impurity.

15. The method of claim 14, wherein during the partial decomposition of the carbonate material to at least one metal oxide, the at least one metal oxide reacts with $SiO_2$ present as an impurity in the carbonate material, thereby resulting in the formation of at least one metal silicate.

16. The method of claim 11, wherein the carbonate material comprises an alkaline earth metal carbonate.

17. The method of claim 16, wherein the carbonate material comprises at least one of magnesium carbonate or calcium carbonate.

18. The method of claim 11, wherein a height of the carbonate-polycrystalline diamond high-pressure high-temperature sintered body is smaller than a diameter of the carbonate-polycrystalline diamond high-pressure high-temperature sintered body.

19. The method of claim 11, wherein the first region of the carbonate-based polycrystalline diamond body comprises from about 0 to 5 percent by weight of the carbonate material.

20. The method of claim 11, wherein the second region of the carbonate-based polycrystalline diamond body comprises from about 2 to 9 percent by weight of the carbonate material.

21. The method of claim 1, wherein the carbonate-polycrystalline diamond body comprises the first region forming and proximate a circumferential cutting edge and the second region extending axially, radially or a combination of both away from the first region, wherein the second region has a higher concentration of carbonates than the first region, and the first region extending a height ranging from 15 to 50% of a circumferential side surface.

22. The method of claim 11, wherein the second region has a higher concentration of carbonates, and the first region extending at least 30% of the distance between a circumferential side surface and a radial center of the body.

23. The method of claim 1, wherein the sintered carbonate-polycrystalline diamond body has a first exposed face and a second exposed face, opposite the first exposed face, wherein the first region extends to the first exposed face and the second region extends to the second exposed face.

24. The method of claim 11, wherein the sintered carbonate-polycrystalline diamond body has a first exposed face, a second exposed face opposite the first exposed face, and circumferential side surface extending between the first exposed face and the second exposed face, wherein the first region extends to the circumferential side surface, and the second region is at a radial center of the body.

* * * * *